US011267934B2

(12) United States Patent
Lim et al.

(10) Patent No.: US 11,267,934 B2
(45) Date of Patent: Mar. 8, 2022

(54) POLYESTER RESIN COMPOSITION AND PREPARATION METHOD THEREOF

(71) Applicant: SK CHEMICALS CO., LTD., Gyeonggi-do (KR)

(72) Inventors: Seol-Hee Lim, Seoul (KR); Ji Yea Lee, Gyeonggi-do (KR); Sung-Gi Kim, Gyeonggi-do (KR); Sun Dongbang, Gyeonggi-do (KR)

(73) Assignee: SK Chemicals Co., Ltd.

( * ) Notice: Subject to any disclaimer, the term of this patent is extended or adjusted under 35 U.S.C. 154(b) by 132 days.

(21) Appl. No.: 16/704,156

(22) Filed: Dec. 5, 2019

(65) Prior Publication Data

US 2020/0109240 A1    Apr. 9, 2020

Related U.S. Application Data

(62) Division of application No. 15/505,529, filed as application No. PCT/KR2015/008827 on Aug. 24, 2015, now Pat. No. 10,550,223.

(30) Foreign Application Priority Data

Aug. 26, 2014 (KR) .................. 10-2014-0111843

(51) Int. Cl.
| | |
|---|---|
| *C08L 67/02* | (2006.01) |
| *C08G 63/199* | (2006.01) |
| *C08G 63/18* | (2006.01) |
| *C08K 3/10* | (2018.01) |
| *C08L 67/03* | (2006.01) |
| *C08G 63/183* | (2006.01) |
| *C08G 63/672* | (2006.01) |
| *C08J 5/18* | (2006.01) |
| *C08K 5/098* | (2006.01) |
| *C08G 63/127* | (2006.01) |
| *C08G 63/137* | (2006.01) |
| *C08G 63/181* | (2006.01) |

(52) U.S. Cl.
CPC ........... *C08G 63/199* (2013.01); *C08G 63/18* (2013.01); *C08G 63/183* (2013.01); *C08G 63/672* (2013.01); *C08J 5/18* (2013.01); *C08K 3/10* (2013.01); *C08K 5/098* (2013.01); *C08L 67/02* (2013.01); *C08L 67/03* (2013.01); *C08G 63/127* (2013.01); *C08G 63/137* (2013.01); *C08G 63/181* (2013.01); *C08J 2367/02* (2013.01); *C08K 2201/014* (2013.01); *C08K 2201/015* (2013.01)

(58) Field of Classification Search
None
See application file for complete search history.

(56) References Cited

U.S. PATENT DOCUMENTS

| | | | |
|---|---|---|---|
| 4,440,924 A * | 4/1984 | Kuze ................. | C08G 63/87 528/274 |
| 2012/0329980 A1 * | 12/2012 | George ............ | C08G 63/183 528/300 |
| 2016/0068629 A1 | 3/2016 | Lim et al. | |
| 2017/0275419 A1 | 9/2017 | Lim et al. | |

FOREIGN PATENT DOCUMENTS

| | | |
|---|---|---|
| EP | 2360202 | 8/2011 |
| JP | 2000-159872 | 6/2000 |
| JP | 2001-114881 | 4/2001 |
| JP | 2003-292590 | 10/2003 |
| JP | 2005-139280 | 6/2005 |
| KR | 10-2013-0138284 | 12/2013 |
| KR | 10-2014-0021755 | 2/2014 |
| WO | WO 2006/095901 | 9/2006 |

OTHER PUBLICATIONS

International Search Report prepared by the Korean International Property Office dated Nov. 26, 2015, for International Application No. PCT/KR2015/008827.
Extended Search Report for European Patent Application No. 15835146.0, dated Feb. 12, 2018, 6 pages.
Official Action for U.S. Appl. No. 15/505,529, dated Mar. 7, 2018 10 pages Restriction Requirement.

(Continued)

*Primary Examiner* — Richard A Huhn
(74) *Attorney, Agent, or Firm* — Sheridan Ross P.C.

(57) ABSTRACT

The present invention relates to a polyester resin composition capable of having an excellent shrinkage rate, being heat-shrunk at a low temperature, and improving adhesion properties, without impairing insulation properties in a state of heat-shrinkable films, and a method for preparing the same. The present polyester resin composition comprises: a copolymerized polyester resin including a dicarboxylic acid-derived residue including a residue derived from an aromatic dicarboxylic acid; and a diol-derived residue including a residue derived from 4-(hydroxymethyl)cyclohexyl methyl 4'-(hydroxymethyl)cyclohexane carboxylate, and a residue derived from 4,4-(oxybis(methylene)bis) cyclohexane methanol, an alkali metal compound, and an alkaline earth metal compound, wherein the alkali metal compound and the alkaline earth metal compound are contained in an amount that the content ratio of the alkali metal element/the alkaline earth metal element derived therefrom is 0.01 to 1.

4 Claims, No Drawings

(56) References Cited

OTHER PUBLICATIONS

Official Action for U.S. Appl. No. 15/505,529, dated Aug. 1, 2018 8 pages.
Official Action for U.S. Appl. No. 15/505,529, dated Jan. 18, 2019 9 pages.
Official Action for U.S. Appl. No. 15/505,529, dated May 3, 2019 12 pages.
Notice of Allowance for U.S. Appl. No. 15/505,529, dated Aug. 30, 2019 10 pages.

* cited by examiner

POLYESTER RESIN COMPOSITION AND PREPARATION METHOD THEREOF

CROSS REFERENCE TO RELATED APPLICATIONS

This application is a divisional application of U.S. patent application Ser. No. 15/505,529, filed 21 Feb. 2017, which is a national stage application under 35 U.S.C. 371 and claims the benefit of PCT Application No. PCT/KR2015/008827 having an international filing date of 24 Aug. 2015, which designated the United States, which PCT application claimed the benefit of Korean Patent Application No. 10-2014-0111843 filed 26 Aug. 2014, the disclosures of each of which are incorporated herein by reference.

TECHNICAL FIELD

The present invention relates to a polyester resin composition capable of having an excellent shrinkage rate, being heat-shrunk at a low temperature, and improving adhesion properties, without impairing insulation properties in a state of heat-shrinkable films, and a method for preparing the same.

BACKGROUND

Heat shrinkable plastic products have a property of being shrunk when heated and so are widely used as films for a shrinkage package, a shrinkage label, or the like. Among them, polyvinyl chloride (PVC), polystyrene, and polyester-based plastic films have been used as labels or cap seals of various containers or used as a direct package material, or the like, However, films made of polyvinyl chloride are subject to environmental restrictions since at the time of incinerating the film, hydrogen chloride gas and a dioxin-causing material may be generated. In addition, when this product is used as a shrinkage label of a polyethylene terephthalate (PET) container, or the like, at the time of reusing the container, a troublesome process of separating the label and the container from each other has to be undergone.

Further, the polystyrene-based films have good working stability when undergoing the shrinkage process, and the appearance of the product may be good, but have poor chemical resistance, undesirably requiring that an ink having a specific composition should be used for printing. Furthermore, the polystyrene-based the films have a disadvantage in that since storage stability at room temperature is insufficient, the film may become spontaneously shrunk, undesirably deforming the dimensions thereof.

In order to solve the above-mentioned problems, a film made of a polyester resin has been studied and developed as a film capable of replacing the films made of the above-mentioned two raw materials. Moreover, as a use amount of the PET container increases, a use amount of a polyester film capable of being easily reused without separately separating a label at the time of reuse has been gradually increased, but a heat shrinkable polyester film according to the related prior art had a problem in view of shrinkage characteristic. That is, there was a problem in that wrinkles at the time of shrinkage or non-uniform shrinkage during a molding process were frequently generated due to a rapid change in shrinkage behavior. In addition, a shrinkage property of the polyester film at a low temperature was decreased as compared to the polyvinyl chloride-based film or the polystyrene-based film. In order to complement this disadvantage, therefore, the polyester film should be shrunk at a high temperature. In this case, there were problems in that PET container may be deformed, or a white-turbidity phenomenon may occur.

Thus, there has been continuous demand to develop a copolymerized polyester resin having an excellent shrinkage rate and an improved shrinkage property at a low temperature, and a heat shrinkable film comprising the polyester resin above.

On the other hand, if it is desired to obtain a molded product in the form of a film as a heat shrinkable film using the polyester resin, it is necessary to further improve the adhesion property of such molded product or its intermediate, a molten sheet. The reason is that, in order to produce a film with a thinner and uniform thickness at high speed using the polyester resin, the molten sheet extruded from the extruder needs to be in close contact with the cooling means (for example, cooling roll) and solidified in the course of preparing the molded product in the form of a film. Furthermore, recently, as the thickness of the film to be produced becomes thinner, such demand has been increased.

For this reason, in the past, a method of adding an electrostatic applying agent to the molten sheet to improve the application and adhesion properties was applied. In this case, however, the insulating properties of the polyester resin and the heat-shrinkable film comprising the polyester resin can be significantly deteriorated.

To solve these problems, methods for improving the adhesion property by closely adhering to the molten sheet by the power of wind using an air knife instead of an electrostatic applying agent or by spraying or coating a liquid having a low surface tension with a rotating cooling roll and the like have been suggested. However, these methods have disadvantages in that the whole process is complicated and difficult to control.

DETAILED DESCRIPTION OF THE INVENTION

Technical Problem

The object of the present invention is to provide a polyester resin composition capable of having an excellent shrinkage rate, being heat-shrunk at a low temperature, and improving adhesion properties, without impairing insulation properties in a state of heat-shrinkable films, and a method for preparing the same.

Technical Solution

In order to achieve the above object, the present invention provides a polyester resin composition comprising: a copolymerized polyester resin including a dicarboxylic acid-derived residue including a residue derived from an aromatic dicarboxylic acid; and a diol-derived residue including a residue derived from 4-(hydroxymethyl)cyclohexylmethyl 4'-(hydroxymethyl)cyclohexane carboxylate represented by the following Chemical Formula 1, and a residue derived from 4,4-(oxybis(methylene)bis)cyclohexane methanol represented by the following Chemical Formula 2, an alkali metal compound, and an alkaline earth metal compound, wherein the alkali metal compound and the alkaline earth metal compound are contained in an amount that the content ratio of the alkaline earth metal element/the alkali metal element derived therefrom is about 0.01 to 1:

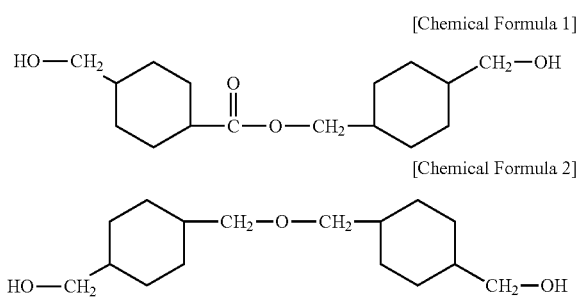

[Chemical Formula 1]

[Chemical Formula 2]

In such polyester resin composition, the alkali metal compound may include one or more alkaline metal elements selected from the group consisting of lithium, sodium and potassium, and the alkaline earth metal compound may include one or more alkaline earth metal elements selected from the group consisting of magnesium, calcium, strontium and barium. Further, in one example, the alkali metal compound or the alkaline earth metal compound includes an alkali metal element or an alkaline earth metal element, and may be a compound in the form of acetates, aliphatic carboxylates, carbonates or alkoxides.

In the polyester resin composition above, the alkali metal compound can be contained in an amount that the content of the alkali metal element derived therefrom is about 5 to 500 ppm, and the alkaline earth metal compound may be contained in an amount that the content of the alkaline earth metal element derived therefrom is about 20 to 1000 ppm.

Further, in the polyester resin composition above, the diol-derived residue may further include a residue derived from 1,4-cyclohexanedimethanol, diethylene glycol and ethylene glycol.

Further, the dicarboxylic acid-derived residue may include a residue derived from one or more dicarboxylic acids or derivatives thereof selected from the group consisting of terephthalic acid, dimethyl terephthalate, cycloaliphatic dicarboxylic acid, isophthalic acid, adipic acid, azelaic acid, naphthalenedicarboxylic acid and succinic acid.

In a specific example, the copolymerized polyester resin contained in the polyester resin composition may comprise about 0.1 to 10 mol % of 4-(hydroxymethyl)cyclohexyl methyl 4'-(hydroxymethyl)cyclohexane carboxylate-derived residue, about 0.1 to 12 mol % of 4,4-(oxybis(methylene) bis)cyclohexane methanol-derived residue, about 0.1 to 15 mol % of 1,4-cyclohexanedimethanol-derived residue, about 2 to 15 mol % of diethylene glycol-derived residue, and about 48 to 97.7 mol % of ethylene glycol-derived residue, based on 100 mol % of the dicarboxylic acid-derived residue.

The above-mentioned polyester resin composition, for example, the composition in a state of a molded product such as a heat shrinkable film, has an initial melt specific resistance (surface resistance) of about 100MΩ/sq or less. After the measurement of the initial melt specific resistance, when the melt specific resistance was measured after a lapse of 120 seconds or less, the polyester resin composition can exhibit a characteristic in which the difference between the initial melt specific resistance value and the measured value is about 20MΩ/sq or less, thus exhibiting a suitable electrostatic applying property and an excellent adhesion property.

Further, the above-mentioned polyester resin composition may not only have a shape such as chips, pellets or powders before molding but also be in the form of a molded product molded by extrusion or injection, for example, a heat-shrinkable film.

When the polyester resin composition has a shape such as the heat-shrinkable film, this heat-shrinkable film exhibits characteristics that the shrinkage initiation temperature is about 60° C. or less, the maximum heat shrinkage rate at 60° C. is about 4% or more, and the maximum heat shrinkage rate at 95° C. is 70% or more. Thus, the polyester resin composition can exhibit an excellent shrinkage rate as compared to a film obtained from the previously known polyester resin and the like and be heat-shrunk at a low temperature.

On the other hand, the present invention provides a method for preparing a polyester resin composition comprising: reacting a dicarboxylic acid including an aromatic dicarboxylic acid with the diol including 4-(hydroxymethyl) cyclohexylmethyl 4'-(hydroxymethyl)cyclohexane carboxylate and 4,4-(oxybis(methylene)bis)cyclohexane methanol, thus performing esterification and polycondensation reactions, wherein at least one step of the esterification and polycondensation reaction steps is performed in the presence of an alkali metal compound, and an alkaline earth metal compound, wherein the alkali metal compound and the alkaline earth metal compound are used in an amount that the content ratio of the alkaline earth metal element/the alkali metal element derived therefrom is about 0.01 to 1.

In the method for preparing such a polyester resin composition, the esterification reaction may be performed at a reaction temperature of about 230 to 265□ and a pressure of about 1.0 to 3.0 kg/cm² for about 100 to 300 minutes after injecting the diol at a molar ratio of about 1.2 to 3.0 with respect to the dicarboxylic acid.

Further, the polycondensation reaction can be performed in the presence of one or more additives selected from the group consisting of a catalyst, a stabilizer, and a coloring agent, and the polycondensation reaction may be performed at a reaction temperature of about 260 to 290□ and a reduced pressure of about 400 to 0.1 mmHg.

Advantageous Effects

The polyester resin composition according to the present invention and the heat shrinkable film comprising the same or the like may have an excellent shrinkage rate as compared with the polyester resin according to the prior art, and be heat-shrunk at a low temperature, similarly to the PVC, thereby making it possible to prevent deformation or white-turbidity phenomenon of the PET container that was caused in the heat shrinkage process of the film. In addition, since the shrinkage speed may be easily adjusted, such that the molding defect may be decreased. Therefore, using this polyester resin composition, a heat shrinkable film having an excellent shrinkage characteristics or the like can be provided.

Moreover, when applying the polyester resin composition, the electrostatic application property and the adhesion property of the molten sheet or the like can be further improved in a state of properly maintaining the insulating property in a state of a final manufactured heat-shrinkable film. Therefore, using this polyester resin composition, a heat shrinkable film having excellent properties or the like can be rapidly produced with a thinner and uniform thickness.

DETAILED DESCRIPTION OF THE EMBODIMENTS

The present invention may be variously modified and have various embodiments, and specific embodiments of the present invention will be described in detail. However, the present invention is not limited to the exemplary embodiments described herein, but all of the modifications, equivalents, and substitutions within the spirit and scope of the present invention are also included in the present invention. Further, when it is determined that the detailed description of the known art related to the present invention may obscure the gist of the present invention, the detailed description thereof will be omitted.

As used herein, the term 'residue' means a predetermined moiety or unit included in a resultant of a chemical reaction when a specific compound participates in the chemical reaction, and derived from the specific compound. For example, the 'dicarboxylic acid-derived residue' and the 'diol-derived residue' mean moieties derived from a dicarboxylic acid component or a diol component in polyester formed by an esterification reaction or a polycondensation reaction, respectively.

Meanwhile, an embodiment of the present invention provides the polyester resin composition comprising:

a copolymerized polyester resin including a dicarboxylic acid-derived residue including a residue derived from an aromatic dicarboxylic acid; and a diol-derived residue including a residue derived from 4-(hydroxymethyl)cyclohexylmethyl 4'-(hydroxymethyl)cyclohexane carboxylate represented by the following Chemical Formula 1, and a residue derived from 4,4-(oxybis(methylene)bis) cyclohexane methanol represented by the following Chemical Formula 2, an alkali metal compound, and an alkaline earth metal compound, wherein the alkali metal compound and the alkaline earth metal compound are contained in an amount that the content ratio of the alkaline earth metal element/the alkali metal element derived therefrom is about 0.01 to 1:

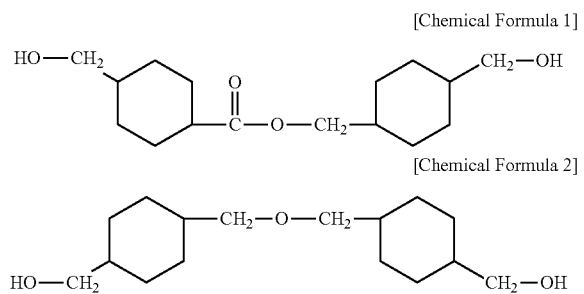

[Chemical Formula 1]

[Chemical Formula 2]

In a polyester film according to the related prior art, there was a problem in that wrinkles at the time of shrinkage or non-uniform shrinkage during a molding process were generated due to a rapid change in shrinkage behavior. In addition, the shrinkage property of the polyester film at a low temperature was decreased as compared to the polyvinyl chloride-based film or the polystyrene-based film. In order to complement this disadvantage, therefore, the polyester film should be shrunk at a high temperature. In this case, there were problems in that PET container may be deformed, or a white-turbidity phenomenon may occur.

Thus, the present inventors found through experiments that in the case of providing a copolymerized polyester resin using a diol including 4-(hydroxymethyl)cyclohexylmethyl 4'-(hydroxymethyl)cyclohexane carboxylate, and 4,4-(oxybis(methylene)bis)cyclohexane methanol, and a molded product such as a heat shrinkable film including the same, a shrinkage rate is excellent, the film may be heat-shrunk at a low temperature, similarly to a PVC, deformation and a white-turbidity phenomenon of a PET container that were caused in a heat shrinkage process of the film may be prevented, and a shrinkage speed may be easily adjusted, thereby a molding defect may be decreased.

Further, in the polyester resin composition according to one embodiment of the present invention, certain additives of an alkali metal compound and an alkaline earth metal compound are used in its production process via the esterification and polymerization reactions, in particular, these two types of additives are used to satisfy the specific content ratio (hereinafter, weight ratio). Thus, as the certain additives are used at a specific weight ratio during the production process, rather than after the polymerization, the insulating properties of the final produced heat shrinkable film or the like can be maintained at the appropriate level. Also, in the course of forming such film, the appropriate electrostatic application property is imparted to the molten sheet or the like extruded from the extruder and thus excellent adhesion properties to the cooling means such as a cooling roll can be achieved. As a result, by using the polyester resin composition according to one embodiment of the invention, the heat shrinkable film or the like having excellent properties can be rapidly produced with a thinner and uniform thickness.

Below, the polyester resin composition according to one embodiment of the invention will be described in more detail for each component.

First, the above-mentioned polyester resin composition comprises a copolymerized polyester resin including a residue derived from a certain diol of 4-(hydroxymethyl)cyclohexylmethyl 4'-(hydroxymethyl)cyclohexane carboxylate and 4,4-(oxybis(methylene)bis)cyclohexane methanol, and a residue derived from an aromatic dicarboxylic acid such as terephthalic acid. By including the residue derived from such certain diol, it is possible to secure the length of molecular chains at a certain level or more associated with the residual stress in the structure of the copolymerized polyester resin as compared with the case of using the other diol. Accordingly, if a molded product such as the heat-shrinkable film is obtained using these copolymerized polyester resins and compositions comprising the same, the residual stress due to the drawing becomes large and so the shrinkage force associated with eliminating the residual stress during heat supply can be increased. As a result, the heat shrinkable film or the like having an excellent shrinkage rate and an improved shrinkability at a low temperature can be obtained.

The 4-(hydroxymethyl)cyclohexylmethyl 4'-(hydroxymethyl)cyclohexane carboxylate-derived residue and the 4,4-(oxybis(methylene)bis)cyclohexane methanol-derived residue can be contained in an amount of about 2 to 17 mol % of the whole diol-derived residue included in the copolymerized polyester resin. This makes it possible to suppress the moldability defect due to crystallization of the copolymerized polyester resin. When the content of the certain diol-derived residue becomes excessively low, it may be difficult to achieve the effect of improving the shrinkage properties at a desired level even if the heat-shrinkable film is formed using the composition of one embodiment of the invention. Conversely, when the content of the certain diol-derived residue becomes excessively high, the whitening phenomenon may occur due to over-drawing and thus it cannot be sufficiently utilized as the heat-shrinkable film. In order to meet the content of the above-mentioned certain diol-derived residue, the certain diol can be used in an amount of about 2 to 17 mol % corresponding thereto in the production process of the copolymerized polyester resin and the composition comprising the same to be described later.

Further, the diol-derived residue contained in the copolymerized polyester resin may further include a residue derived from 1,4-cyclohexanedimethanol, diethylene glycol and ethylene glycol, in addition to the above-mentioned certain diol-derived residue.

Further, the dicarboxylic acid-derived residue contained together with the above diol-derived residue can include residues derived from one or more dicarboxylic acids or derivatives thereof selected from the group consisting of terephthalic acid, dimethyl terephthalate, cycloaliphatic dicarboxylic acid, isophthalic acid, adipic acid, azelaic acid, naphthalenedicarboxylic acid and succinic acid.

Further, in a more specific example, the copolymerized polyester resin contained in the above-mentioned composition can include about 0.1 to 10 mol % of 4-(hydroxymethyl)cyclohexylmethyl-4'-(hydroxymethyl)cyclohexane carboxylate-derived residue, about 0.1 to 12 mol % of 4,4-(oxybis(methylene)bis)cyclohexane methanol-derived residue, about 0.1 to 15 mol % of 1,4-cyclohexane dimethanol-derived residue, about 2 to 15 mol % of diethylene glycol-derived residue, and about 48 to 97.7 mol % of ethylene glycol-derived residue, based on 100 mol % of the dicarboxylic acid-derived residue. Thus, it is possible to obtain the films having not only excellent shrinkage properties such as shrinkage rate and shrinkagability at a low temperature in the state of the heat shrinkable film or the like but also excellent whole physical properties such as moldability and mechanical properties.

Further, in order to meet the content of each of the diol-derived residues, the above-mentioned diols can be used in the respective contents corresponding thereto in the production process of the copolymerized polyester resin and the composition comprising the same to be described later.

Meanwhile, the polyester resin composition according to one embodiment of the invention comprises an alkali metal compound and an alkaline earth metal compound together the aforementioned copolymerized polyester resin and an additive such as a stabilizer. As will be described in more detail below, the alkali metal compound and the alkaline earth metal compound are added during the steps of the esterification or polycondensation reactions for the preparation of a copolymerized polyester resin, and in the presence thereof, the above esterification or polycondensation reaction steps can be performed. As a result, it is predicted that the alkali metal or the alkaline earth metal form a complex. Therefore, it is believed that it is possible to impart electrostatic application properties suitable for the polyester resin composition and a molded product such as the heat shrinkable film formed the above resin composition. Moreover, since such electrostatic application properties are not substantially reduced with the passage of time, it is possible to express and maintain an excellent adhesion property to the cooling means such as a cooling roll. The use of certain additives mentioned above, the use thereof in the production process of the copolymerized polyester resin and the use thereof at a specific content ratio allow expression and maintenance of the above excellent adhesion property in a state of suppressing the reduction of the insulating property.

Due to the addition of the above additive, a reduction in the melt viscosity of the copolymerized polyester resin or in the mechanical physical properties associated with this can be minimized.

The above mentioned characteristics can be achieved not only by the use of the above additive in the production process of the polyester resin but also by the content ratio of specific additives, and the content ratio of these specific additives can be defined in an amount that the content ratio, more particularly the weight ratio, of the alkaline earth metal element/alkali metal element derived from the alkali metal compound and the alkaline earth metal compound is about 0.01 to 1 or about 0.05 to 0.5.

Meanwhile, the alkali metal compounds and alkaline earth metal compounds mentioned above can be included in the form of the compounds per se within the final produced copolymerized polyester resin or the composition containing the same according to one embodiment of the invention, but they can exist as alkali metal elements or ions derived therefrom or in a state where alkali metal elements or ions are separated. Therefore, the content ratio of alkali metal elements/alkaline earth metal elements derived from the alkali metal compounds and alkaline earth metal compounds can be calculated and defined from the total metal content (total weight) of the alkali metal or alkaline earth metal contained the copolymerized polyester resin and composition derived from these additives, irrespective of the above-mentioned form of existence, for example, the form of existence of compounds including metal elements, ions, complex ions or at least one of these. More specifically, the content ratio of the alkaline earth metal element/the alkali metal element can be calculated as the weight ratio of (total weight of total atoms, ions, and complex ions of alkaline earth metal)/(total weight of total atoms, ions, and complex ions of alkali metal) included in these, regardless of the above-mentioned form of existence.

In addition, the alkali metal compound may be a compound in which any alkali metal is bound with an organic group. For example, the alkali metal compound may include one or more alkali metal elements selected from the group consisting of lithium, sodium and potassium. Furthermore, the alkaline earth metal compound may be a compound in which various alkaline earth metal compounds are bound with organic groups. For example, the alkaline earth metal compound can include one or more alkaline earth metal elements selected from the group consisting of magnesium, calcium, strontium and barium.

In a more specific example, the alkali metal compound and alkaline earth metal compound mentioned above comprise the above-mentioned alkali metal or alkaline earth metal, and they can be a compound having the form of alkali metal or alkaline earth metal-bound acetate, aliphatic carboxylate, carbonate or alkoxide.

The most representative examples of these alkali metal compounds may include lithium hydroxide, lithium acetate, lithium carbonate, sodium hydroxide, sodium acetate, sodium ethoxide, potassium hydroxide, potassium acetate or potassium carbonate, and the like. The most representative examples of these alkaline earth metal compounds may include magnesium hydroxide, magnesium acetate, calcium acetate, strontium acetate or barium acetate, and the like. Of course, two or more selected from the above may be used. In addition to the above exemplified compounds, compounds having various salt forms in which the alkali metal or alkaline earth metal is bonded with organic groups can be used.

Further, in the polyester resin composition, the alkali metal compound can be contained in an amount that the content of the alkali metal element derived therefrom is about 5 to 500 ppm or about 20 to 200 ppm, and the alkaline earth metal compound can be contained in an amount that the content of the alkaline earth metal element derived therefrom is about 20 to 1000 ppm or about 60 to 600 ppm. However, they can be contained in the above-mentioned content range, within the range satisfying the relation in which the content ratio of the above-mentioned alkaline earth metal element/the alkali metal element is about 0.01 to 1.

When the content of the alkali metal compound or alkaline earth metal compound becomes excessively low, it may be not possible to impart the proper electrostatic application or adhesion properties suitable for the molten sheet to be formed from the composition according to one embodiment of the invention. Conversely, when the content of the alkali metal compound becomes excessively high, it may act as an impurity, thus decreasing the reactivity during the polymerization. Further, when the content of the alkaline earth metal compound becomes excessively high the reactivity during the polymerization may be lowered or the haze of the molded product such as extruded molten sheet or heat-shrinkable film may increase.

The above-mentioned polyester resin composition, for example, the composition in a state of the molded article such as a heat shrinkable film, has an initial melt specific resistance of about 100MΩ/sq or less, or about 10 to 70MΩ/sq as measured immediately after its production. After the measurement of the initial melt specific resistance, when the melt specific resistance was measured after a lapse of 120 seconds or less, or 0 to 120 seconds or less, or 1 to 120 seconds or less, the composition can exhibit a characteristic in which the difference between the initial melt specific resistance value and the measured value is about 20MΩ/sq or less, or about 5MΩ/sq or less.

Thus, as the initial melt specific resistance is low below a predetermined level and a level of reduction with the passage of time is low, the electrostatic application property suitable for the molten sheet obtained from the above composition can be imparted. The molten sheet exhibits an excellent adhesion property to a cooling means such as a cooling roll and thus films with thinner and uniform thickness can be produced at a faster rate. Simultaneously, the alkali metal compound and the alkaline earth metal compound are used in a predetermined content ratio, and they are used during the production process of the copolymerized polyester resin, thereby controlling the initial melt specific resistance above a certain level. Therefore, the insulating properties of the heat-shrinkable film formed from the above composition can be maintained above a certain level.

On the other hand, another embodiment of the invention provides a method for preparing a polyester resin composition comprising: reacting a dicarboxylic acid including an aromatic dicarboxylic acid with the diol including 4-(hydroxymethyl)cyclohexylmethyl 4'-(hydroxymethyl)cyclohexane carboxylate and 4,4-(oxybis(methylene)bis)cyclohexane methanol and conducting esterification and polycondensation reactions, wherein at least one step of the esterification and polycondensation reaction steps is performed in the presence of an alkali metal compound, and an alkaline earth metal compound, wherein the alkali metal compound and the alkaline earth metal compound are used in an amount that the content ratio of the alkaline earth metal element/the alkali metal element derived therefrom is about 0.01 to 1.

In the preparation method according to the other embodiment of the invention, since the used amount of the dicarboxylic acid and the diol including certain diols, and the used amount of the alkali metal compound and alkaline earth metal compound correspond to the content of each of the components in the composition of one embodiment of the invention described above, an additional description thereof will be omitted.

Further, in these production methods, the alkali metal compound and the alkaline earth metal compound may be added at the beginning or end of the esterification reaction step, or they may be added at the beginning of the polycondensation reaction step for the transesterification reaction, or they may be added at any step before the termination of the other esterification and polycondensation reaction steps.

In the first stage, the esterification can be performed in a batch or continuous process, and respective materials can be separately added, but addition of dicarboxylic acid in a slurry form to the diol is preferable.

Further, the esterification reaction may be performed at a reaction temperature of about 230 to 265☐ or about 245 to 255☐ and a pressure of about 1.0 to 3.0 kg/cm² after injecting the diol at a molar ratio of about 1.2 to 3.0 with respect to the dicarboxylic acid. Further, the esterification reaction time is typically about 100 to 300 minutes, which can be appropriately varied depending on the reaction temperature, the pressure, and the molar ratio of the diol with respect to the dicarboxylic acid to be used, and thus it is not limited thereto.

Meanwhile, the esterification reaction does not require catalysts, but it is possible to selectively add the catalyst in order to shorten the reaction time.

After the above-mentioned esterification reaction is completed, the polycondensation reaction is performed. As the components typically used during the polycondensation reaction of the polyester resin, one or more additives selected from the group consisting of catalysts, stabilizers and coloring agents may be optionally used.

In this case, examples of the catalyst usable in the present invention include titanium, germanium, and antimony compound or the like, but it is not particularly limited thereto.

The above titanium-based catalyst is a catalyst used as a polycondensation catalyst of the polyester resin in which the cyclohexane dimethanol-based derivative is copolymerized to about 15% or more with respect to the weight of the terephthalic acid. Although the titanium-based catalyst is used in a small amount, the reaction can be carried out. In addition, the titanium-based catalyst has an advantage that price is cheaper than a germanium-based catalyst.

Specific examples of the titanium-based catalyst include tetraethyl titanate, acetyl tri-propyl titanate, tetrapropyl titanate, tetrabutyl titanate, tetrabutyl titanate, polybutyl titanate, 2-ethylhexyl titanate, octylene glycol titanate, lactate titanate, triethanolamine titanate, acetylacetonate titanate, ethylacetoacetate ester titanate, isostearyl titanate, titanium dioxide, coprecipitate of titanium dioxide and silicon dioxide, coprecipitate of titanium dioxide and zirconium dioxide, and the like.

In this case, since a use amount of the polycondensation catalyst affects the color of the final copolymerized polyester resin, the amount may be changed depending on the desired color, the used stabilizer, and the used coloring agent, but the amount may be preferably about 1 to 100 ppm or about 1 to 50 ppm, based on a content of a titanium element with respect to a weight of the final copolymerized polyester resin, and may be suitably about 10 ppm or less based on a content of a silicon element. The reason is that in the case in which the content of the titanium element is less than about 1 ppm, it is impossible to reach a desired degree of polymerization, and in the case in which the content of the titanium element is more than about 100 ppm, the final resin becomes yellow, such that it is impossible to obtain a desired color.

Further, as other additives, the stabilizer, the coloring agent, and the like, may be used. As the stabilizer usable in the present invention, there are phosphoric acid, trimethyl phosphate, triethylphosphate, triethylphosphonoacetate, and the like, and an addition amount thereof may be preferably about 10 to 100 ppm based on a content of a phosphorus element with respect to the weight of the final resin. The reason is that in the case in which the addition amount of the stabilizer is less than about 10 ppm, it is difficult to obtain the desired color, and in the case in which the addition amount of the stabilizer is more than about 100 ppm, it is impossible to reach a desired high degree of polymerization.

Further, as the coloring agent usable in the present invention in order to improve the color, cobalt acetate, cobalt propionate and the like can be exemplified, and an addition amount thereof may be preferably about 100 ppm or less based on the weight of the final polymer. Furthermore, in addition to the above-exemplified coloring agents, an existing organic compound known in the art may be used as the coloring agent.

Meanwhile, the polycondensation reaction performed after addition of these components may be preferably performed at about 260 to 290□ and a reduced pressure of about 400 to 0.1 mmHg, but is not limited thereto.

The polycondensation step is performed until viscosity of the reactant reaches a desired intrinsic viscosity. In this case, a reaction temperature may be generally about 260 to 290□, preferably about 260 to 280□, and more preferably about 265 to 275□.

The polyester resin composition of one embodiment of the invention produced by the above-mentioned method may not only have the form of chip, pellet or powder prior to the molding but also be in the form of a molded product formed by a separate molding process such as extrusion or injection, for example, films or sheets such as the heat-shrinkable film.

When the polyester resin composition has the form such as the heat-shrinkable film, this heat shrinkable film may exhibit characteristics that the shrinkage initiation temperature may be about 60□ or less, or about 40 to 60□, or about 50 to 60□, the maximum heat shrinkage rate at 60□ may be about 4% or more, or about 4 to 10%, or about 5 to 9%, and the maximum heat shrinkage rate at 95□ may be about 70% or more, or about 73 to 90%. Thus, this heat shrinkable film can have an excellent shrinkage rate as compared to the film obtained from the previously known polyester resin and the like and exhibit heat shrinkage properties at a low temperature.

Hereinafter, preferable Examples of the present invention will be described in detail. However, this example is only to illustrate the present invention and is not to be construed as limiting a scope of the present invention.

Example 1

In a batch reactor, 8 moles of 4-(hydroxymethyl) cyclohexane carboxylic acid, 2 moles of 4,4-(oxybis(methylene) bis)cyclohexane methanol, 10 moles of 1,4-cyclohexanedimethanol, 10 moles of diethylene glycol, and 72 moles of ethylene glycol, based on 100 moles of terephthalic acid, were mixed while slowly raising the temperature up to 255□, thereby performing an esterification reaction. At this time, the esterification reaction was performed by discharging generated water out of the reactor, and when generation and discharge of water were terminated, the contents of the reactor were transferred to a polycondensation reactor equipped with a stirrer, a cooling condenser, and a vacuum system.

In the polycondensation reactor, 0.5 g of tetrabutyl titanate, 0.4 g of triethyl phosphate and 0.5 g of cobalt acetate were added to the esterification reactant, and then a polycondensation reaction was primarily performed while maintaining an atmospheric pressure and raising an internal temperature from 240□ to 275□. Then, 30 ppm of alkaline earth metal compound of magnesium acetate was added in the reactor to which 500 ppm of alkali metal compound of potassium acetate was added, thereby performing the reaction. Subsequently, a low vacuum reaction was performed under a pressure of 50 mmHg for 40 minutes and ethylene glycol was removed, and again the pressure was slowly reduced up to 0.01 mmHg, such that the reaction was performed under a high vacuum until a desired intrinsic viscosity was obtained. After the polycondensation reaction as described above, the resulting product was ejected and cut in a chip form.

A heat shrinkable film was prepared using the prepared composition comprising the copolymerized polyester resin and additives.

Examples 2 and 3

A copolymerized polyester resin, a composition containing the same and a heat shrinkable film were prepared by the same manner as in Example 1, except that the use amount and content ratio of the alkaline earth metal compound and the alkali metal compound were changed as shown in Table 1 below.

Comparative Example 1

A copolymerized polyester resin, a composition containing the same and a heat shrinkable film were prepared by the same manner as in Example 1 except that the alkaline earth metal compound and the alkali metal compound were not used as shown in Table 1 below.

Comparative Examples 2 to 4

A copolymerized polyester resin, a composition containing the same and a heat shrinkable film were prepared by the same manner as in Example 1 except that the use amount and content ratio of the alkaline earth metal compound and the alkali metal compound were changed as shown in Table 1 below.

Experimental Example

The physical properties of the heat shrinkable film prepared in Examples and Comparative Examples were measured by the following methods, and the measured results were shown in Table 1 below.

(1) Glass Transition Temperature (Tg): The glass transition temperature was measured using a differential scanning calorimetry (TA instrument Co.).

(2) Intrinsic Viscosity (IV): The intrinsic viscosity was measured using a Ubbelohde viscometer at a constant temperature bath of 35□ after dissolving the prepared polyester resin in ortho-chlorophenol at a concentration of 0.12% at 150□.

(3) Heat Shrinkage Rate: A sample of the prepared film was cut into a square (10 cm×10 cm) and drawn at a draw ratio (DR) of 1:5 (MD:TD), a draw speed of 10 mm/min and a draw temperature of 85□, and then the film was put into an oven at the temperature shown in Table 1 below for 60 seconds to thereby be heat-shrunk. Thereafter, a length of the sample in horizontal and vertical directions was measured, and the heat shrinkage rate was calculated by the following Equation.

Heat shrinkage rate (%)=100×(length before shrinkage−length after shrinkage)/(length before shrinkage)

(4) Melt specific resistance/surface resistance (MΩ/sq): Platinum electrodes with a spacing of 1 cm and an electrode area of 1 cm$^2$ were installed in a test tube with a diameter of 5 cm to which 40 g of the compositions or heat shrinkable films of the Examples and Comparative Examples were added and then melted at 275□ under nitrogen atmosphere. Subsequently, the initial melt specific resistance (initial measurement value) was measured using a resistance measuring instrument.

(5) Changes in the melt resistance with time (MO/sq): After the compositions or the like of Examples and Comparative Examples were prepared, the initial melt specific resistance was measured within 1-10 seconds in the same manner as in the above (4). After the initial melt specific resistance was measured, the melt specific resistance was measured again after a lapse of about 120 seconds to calculate the amount of change.

change with the passage of time, thus maintaining an unique proper insulating property of the polyester resin film in the form of a film.

In comparison, in the case of the Comparative Examples, it was confirmed that an initial value of the melt specific resistance is high or a level of change with time is large, thus not exhibiting excellent electrostatic application and adhesion properties.

Although the present invention has been described in detail based on particular features thereof, and it is obvious to those skilled in the art that these specific technologies are merely preferable embodiments and thus the scope of the present invention is not limited to the embodiments. Therefore, the substantial scope of the present invention is defined by the accompanying claims and equivalent thereof.

What is claimed is:

1. A method for preparing a polyester resin composition comprising:
    reacting a dicarboxylic acid including an aromatic dicarboxylic acid with a diol including, based on 100 mol % of the dicarboxylic acid, 0.1 to 10 mol % of 4-(hydroxymethyl)cyclohexylmethyl 4'-(hydroxymethyl)cyclohexane carboxylate, 0.1 to 12 mol % of 4,4-(oxybis(methylene)bis)cyclohexane methanol, 0.1 to 15 mol % of a 1,4-cyclohexanedimethanol-derived residue, 2 to 15 mol % of a diethylene glycol-derived residue, and 48 to 97.7 mol % of an ethylene glycol-derived residue, thus performing esterification and polycondensation reactions,
    wherein at least one step of the esterification and polycondensation reaction steps is performed in the presence of an alkali metal compound, and an alkaline earth metal compound,

TABLE 1

| | Example 1 | Example 2 | Example 3 | Comparative Example 1 | Comparative Example 2 | Comparative Example 3 | Comparative Example 4 |
|---|---|---|---|---|---|---|---|
| Alkakine earth metal compound - metal content (Mg, ppm) | 30 | 100 | 60 | — | 500 | 40 | 400 |
| Alkali metal compound - metal content(K, ppm) | 500 | 500 | 80 | — | 25 | 20 | |
| Alkaline earth metal/alkali metal content ratio(weight ratio) | 0.06 | 0.2 | 0.75 | — | 20 | 2 | — |
| Glass transition temperature(□) | 68 | 68 | 68 | 70 | 69 | 69 | 68 |
| Intrinsic viscosity | 0.68 | 0.67 | 0.68 | 0.72 | 0.70 | 0.71 | 0.69 |
| Shrinkage initiation temperature(□) | 57 | 56 | 57 | 58 | 58 | 58 | 57 |
| Heat shrinkage rate - 60□ (%) | 6 | 8 | 7 | 7 | 6 | 7 | 7 |
| Heat shrinkage rate - 95□(%) | 74 | 73 | 74 | 75 | 76 | 74 | 74 |
| Melt specific resistance: initial value (MΩ cm) | 21.3 | 13.1 | 35 | >200 | 6.4 | 50 | 69 |
| Change in melt resistance with time: intitial-after 120 seconds (MΩ cm) | 0.5 | 0.7 | 3 | — | 7.1 | 15.5 | 12 |

As shown in Table 1 above, it was confirmed that both the composition and the heat shrinkable film of the Examples and Comparative Examples have a low shrinkage initiation temperature and exhibit excellent heat shrinkage rate.

Further, it was confirmed that the composition and the like of the Examples not only maintained the initial melt specific resistance at a proper level but also had a low amount of wherein the alkali metal compound and the alkaline earth metal compound are used in amounts such that a weight ratio of the alkaline earth metal element to the alkali metal element is between 0.01 and 1.

2. The method for preparing a polyester resin composition according to claim 1 wherein the esterification reaction is performed at a reaction temperature of 230 to 265° C. and a pressure of 1.0 to 3.0 kg/cm$^2$ for 100 to 300 minutes after injecting the diol at a molar ratio of 1.2 to 3.0 with respect to the dicarboxylic acid.

3. The method for preparing a polyester resin composition according to claim 1 wherein the polycondensation reaction is performed in the presence of one or more additives selected from the group consisting of a catalyst, a stabilizer, and a coloring agent.

4. The method for preparing a polyester resin composition according to claim 1 wherein the polycondensation reaction is performed at a reaction temperature of 260 to 290° C. and a reduced pressure of 400 to 0.1 mmHg.

* * * * *